United States Patent [19]

Dean

[11] Patent Number: 4,731,418

[45] Date of Patent: Mar. 15, 1988

[54] DIELS-ALDER GRAFT POLYMERS

[75] Inventor: Barry D. Dean, Broomall, Pa.

[73] Assignee: ARCO Chemical Company, Newtown Square, Pa.

[21] Appl. No.: 902,737

[22] Filed: Sep. 2, 1986

[51] Int. Cl.$^4$ .............................................. C08L 39/04
[52] U.S. Cl. ..................................... 525/205; 525/203
[58] Field of Search ....................... 525/205, 902, 203

[56] References Cited

U.S. PATENT DOCUMENTS 4,485,215  11/1984  Dean ................................... 525/205

Primary Examiner—Theodore E. Pertilla
Attorney, Agent, or Firm—Dennis M. Kozak

[57] ABSTRACT

Graft polymers between glassy polymers and elastomeric polymers prepared using Diels-Alder chemistry are disclosed.

15 Claims, No Drawings

DIELS-ALDER GRAFT POLYMERS

This invention relates to novel graft polymers. More specifically, this invention relates to the formation of graft polymers between glassy polymers and elastomeric polymers using thermally initiated Diels-Alder chemistry.

In one of its more specific aspects, this invention pertains to the incorporation of N-(benzocyclobutenyl)-maleimide into a glassy polymer followed by the reaction of the maleimide containing glassy polymer with an elastomer having pendant carbon-carbon double bonds via Diels-Alder chemistry. The resulting graft polymers exhibit excellent impact strength properties upon molding.

According to this invention, there is provided a graft polymer represented by formula (I):

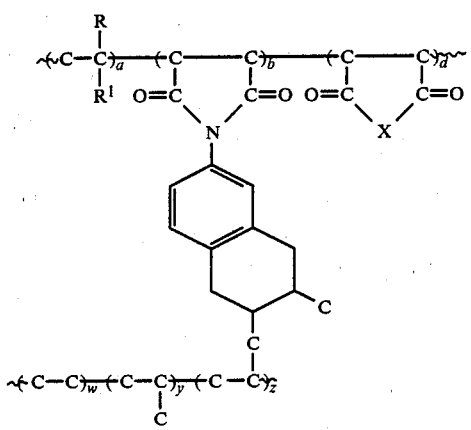

wherein R represents hydrogen or alkyl; $R^1$ represents phenyl, alkyl substituted phenyl, chloro or bromo substituted phenyl, $CO_2H$, $CO_2CH_3$, $CO_2CH_2CH_3$, or $C\equiv N$; X represents O, NH, $NCH_3$, $NCH_2CH_3$, $NC(CH_3)_3$, $NC_6H_5$, $N\text{-}(p\text{-}Br)C_6H_4$, $N\text{-}(p\text{-}CH_3)C_6H_4$, $N\text{-}[p\text{-}C(CH_3)_3]C_6H_4$, or $N\text{-}(p\text{-}CH_3O)C_6H_4$; the mole percent of the total recurring units designated by subscripts $a+b+d$ equals 100 with a being a number from about 95 to about 99.5, b being a number from about 0.5 to about 5, and d being a number from 0 to about 45, with the proviso that if the recurring unit designated by subscript d is present, it is directly substituted for a portion of the recurring unit designated by the subscript a; the mole percent of the total recurring units designated by subscripts $w+y+z$ equals 100, with w being a number from about 30 to about 55, y being a number from about 44.9 to about 55, and z being a number of from about 0.1 to about 15; and, wherein at least 1 percent of the recurring units designated by the subscript b and at least 1 percent of the recurring units designated by the subscript z have been reacted to form a graft structure.

Also according to this invention there is provided a method of producing the graft polymer represented by formula (I) above, comprising reacting a first and a second polymer at a reaction temperature equal to or greater than 250° C., said first copolymer being represented by the following formula (IV):

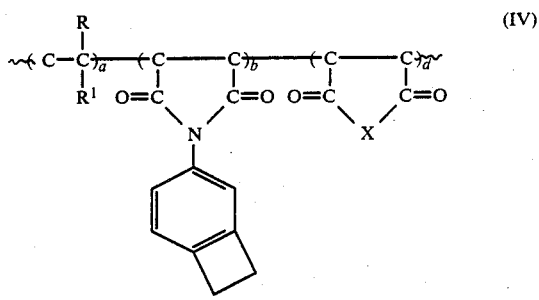

wherein R, $R^1$, X, a, b, and d are as defined above; and said second copolymer is represented by the following formula (V):

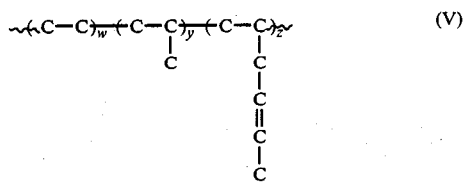

wherein w, y, and z are as defined above.

According to this invention there is also provided a graft polymer represented by formula (II):

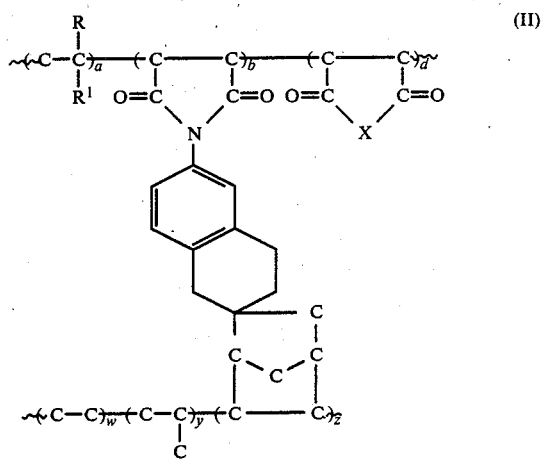

wherein:

R represents hydrogen or alkyl;

$R^1$ represents phenyl, alkyl substituted phenyl, chloro or bromo substituted phenyl, $CO_2H$, $CO_2CH_3$, $CO_2CH_2CH_3$, or $C\equiv N$; X represents O, NH, $NCH_3$, $NCH_2CH_3$, $NC(CH_3)_3$, $NC_6H_5$, $N\text{-}(p\text{-}Br)C_6H_4$, $N\text{-}(p\text{-}CH_3)C_6H_4$, $N\text{-}[p\text{-}C(CH_3)_3]C_6H_4$, or $N\text{-}(p\text{-}CH_3O)C_6H_4$; the mole percent of the total recurring units designated by subscripts $a+b+d$ equals 100 with a being a number from about 95 to about 99.5, b being a number from about 0.5 to about 5, and d being a number from 0 to about 45, with the proviso that if the recurring unit designated by subscript d is present, it is directly substituted for the recurring unit designated by the subscript a; the mole percent of the total recurring units designated by subscripts $w+y+z$ equals 100, with w being a number from about 30 to about 55, y being a number from about 44.9 to about 55, and z being a number of from about 0.1 to about 15; and wherein at least 1 percent of the recurring units designated by the subscript b and at least 1 percent of the recurring units designated by the subscript z have been reacted to form a graft structure.

Also according to this invention there is provided a method of producing the graft polymer represented by formula (II) above comprising reacting a first and a second polymer at a reaction temperature equal to or greater than 250° C., said first copolymer being represented by the following formula (IV):

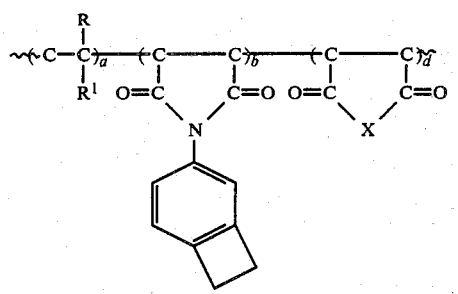

wherein R, $R^1$, X, a, b, and d are as defined above; and said second copolymer is represented by the following formula (VI):

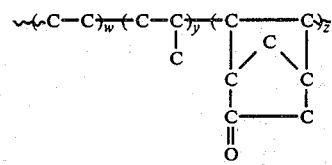

wherein w, y, and z are as defined above.

According to this invention there is also provided a graft polymer represented by formula (III):

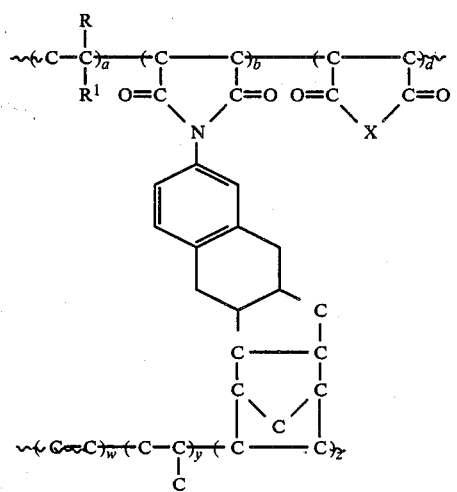

wherein:

R represents hydrogen or alkyl;

$R^1$ represents phenyl, alkyl substituted phenyl, chloro or bromo substituted phenyl, $CO_2H$, $CO_2CH_3$, $CO_2CH_2CH_3$, or $C\equiv N$; X represents O, NH, $NCH_3$, $NCH_2CH_3$, $NC(CH_3)_3$, $NC_6H_5$, $N\text{-}(p\text{-}Br)C_6H_4$, $N\text{-}(p\text{-}CH_3)C_6H_4$, $N\text{-}[p\text{-}C(CH_3)_3]C_6H_4$, or $N\text{-}(p\text{-}CH_3O)C_6H_4$; the mole percent of the total recurring units designated by subscripts a+b+d equals 100 with a being a number from about 95 to about 99.5, b being a number from about 0.5 to about 5, and d being a number from 0 to about 45, with the proviso that if the recurring unit designated by subscript d is present, it is directly substituted for the recurring unit designated by the subscript a; the mole percent of the total recurring units designated by subscripts w+y+z equals 100, with w being a number from about 30 to about 55, y being a number from about 44.9 to about 55, and z being a number of from about 0.1 to about 15; and wherein at least 1 percent of the recurring units designated by the subscript b and at least 1 percent of the recurring units designated by the subscript z have been reacted to form a graft structure.

Also according to this invention there is provided a method of producing the graft polymer represented by formula (III) above comprising reacting a first and a second polymer at a reaction temperature equal to or greater than 250° C., said first copolymer being represented by the following formula (IV):

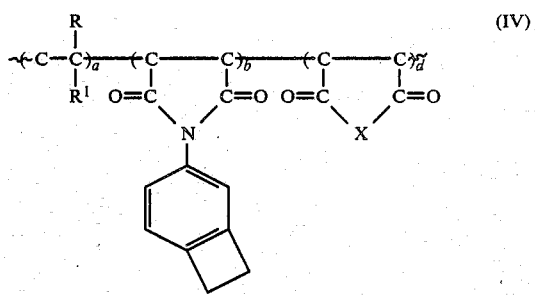

wherein R, $R^1$, X, a, b, and d are as defined above; and said second copolymer is represented by the following formula (VII):

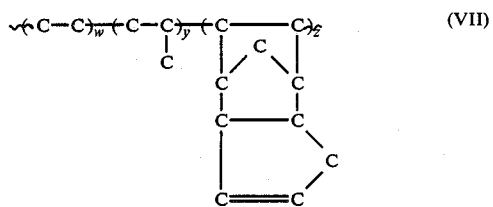

wherein w, y, and z are as defined above.

According to this invention, there is also provided a moldable composition comprising a graft copolymer having the formulae (I), (II), or (III).

The chemistry involved in forming the graft polymers of this invention is illustrated below:

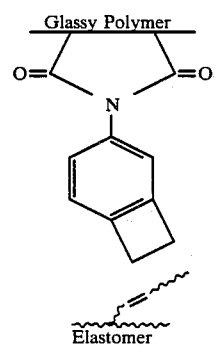

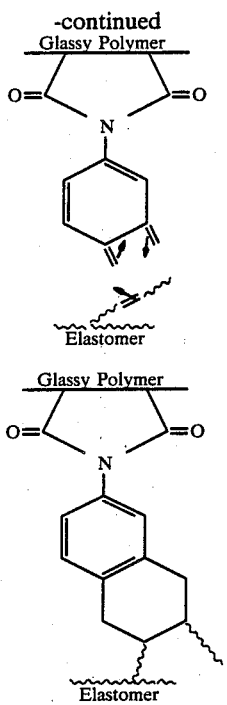

Examples of glassy polymers into which the N-(benzocyclobutenyl)maleimide monomer can be incorporated are vinyl aromatic homopolymers and copolymers such as polystyrene, poly(p-methylstyrene), poly(t-butylstyrene), bromostyrene, chlorostyrene, styrene/maleic anhydride copolymers, styrene/N-arylmaleimide copolymers, styrene/N-alkylmaleimide copolymers, styrene/maleimide copolymers, styrene/methyl methacrylate copolymers, styrene/acrylonitrile copolymers, and styrene/(meth)acrylic acid copolymers, as well as poly(alkyl acrylate) homopolymers and copolymers such as poly(methyl methacrylate), methyl methacrylate/N-arylmaleimide copolymers, methyl methacrylate/N-alkylmaleimide copolymers and methyl methacrylate/maleic anhydride copolymers. The number average molecular weight of the glassy polymers suitable for use to produce the graft polymers of this invention should be from about 100,000 to about 300,000.

Examples of elastomers having pendant unsaturation are ethylene/propylene/non-conjugated diene terpolymers where the non-conjugated diene is selected from 1,4-hexadiene, dicyclopentadiene, methylene norbornene and the like. The number average molecular weight of the elastomers suitable for use to produce the graft polymers of this invention should be from about 50,000 to about 250,000.

The glassy polymers used to produce the graft polymers of this invention will contain from about 1 to about 10 weight percent of the N-(benzocyclobutenyl)maleimide monomer, preferably from about 2 to about 6 weight percent of the N-(benzocyclobutenyl)maleimide monomer.

The elastomer used to produce the graft polymers of this invention will contain from about 1 to about 12 weight percent of the non-conjugated diene, preferably from about 2 to about 5 weight percent of the non-conjugated diene.

The graft polymers of this invention are well suited for molding using any conventional molding/extrusion method suitable for thermoplastics. The molded articles produced from the graft polymers of this invention are characterized by significantly improved impact characteristics. In the formulation of a final molding composition, it is possible, and frequently desirable, to include other ingredients such as extenders, processing aids, pigments, anti-oxidants, stabilizers, mold release agents and the like, for their conventionally employed purpose. Fillers in amounts sufficient to impart reinforcement or property modification can also be added, such as silica, calcium carbonate, talc, mica, processed mineral fibers, titanium dioxide, potassium titanate and titanate whiskers, carbon fibers, aramid fibers, glass flakes, glass spheres, chopped glass fibers, and the like, and their mixtures.

In the following examples, which serve to demonstrate the invention, the evaluation of material properties was performed based on the following ASTM standard tests: Notched Izod (D-256) and DTUL (deflection temperature under load, $\frac{1}{8}''$ at 264 psi) (D-648). Gardner falling weight index (GFWI) was established using a $1\frac{1}{4}''$ diameter orifice and an 8 pound $\frac{1}{2}''$ diameter weight. Glass transition temperature was determined by differential scanning colorimetry (DSC).

EXAMPLE 1

This example serves to demonstrate the preparation of a styrene/N-(benzocyclobutenyl)maleimide copolymer.

A baffled 2-liter resin kettle was equipped with a mechanical stirrer, pressure equalizing addition funnel and nitrogen purge. The resin kettle was charged with 700 grams of styrene monomer. The pressure equalizing addition funnel was charged with a solution containing 185 grams of styrene monomer, 13.5 grams of N-(benzocyclobutenyl)maleimide monomer, and 1.21 grams of VAZO ® 88 free radical initiator (E. I. DuPont Company). The reactor was heated to 110° C. and the contents of the addition funnel were metered in at a rate of 4 milliliters/minute. The reaction was stopped at 44% solids (396 grams) and the polymer was recovered by precipitation into methanol. The nitrogen content of the copolymer was 0.27 weight percent which corresponds to 3.8 weight percent N-(benzocyclobutenyl)maleimide incorporation. The glass transition temperature of the copolymer was 114° C. The number average molecular weight of the copolymer as measured by gel permeation chromatography was 147,900.

EXAMPLE 2

This example serves to demonstrate the thermally activated grafting reaction between the styrene/N-(benzocyclobutenyl)maleimide copolymer produced in Example 1 and an ethylene/propylene/1,4-hexadiene elastomer.

As shown in following Table 1, six moldable compositions (Compositions A-F) were prepared. Composition B is a Diels-Alder graft polymer of this invention. Compositions A, C, D, E, and F are control compositions.

The two components employed in each of Compositions A-F were physically mixed and extruded into pellets in a counterrotating twin screw extruder at 260° C. The resulting pellets were separately molded into test specimens for physical property evaluation. Physical properties were as shown in following Table 1.

TABLE 1

| Blend | Composition, weight percent | | | | | |
|---|---|---|---|---|---|---|
| | A | B | C | D | E | F |
| S/N—(BC)MI[1] | 100 | 88 | 0 | 0 | 0 | 0 |
| Polystyrene | 0 | 0 | 100 | 88 | 0 | 0 |
| S/N—PMI[2] | 0 | 0 | 0 | 0 | 100 | 88 |
| Elastomer[3] | 0 | 12 | 0 | 12 | 0 | 12 |
| Physical Property Data | | | | | | |
| DTUL (⅛", °F., unannealed) | 203 | 200 | 181 | 179 | 199 | 197 |
| Notched Izod (ft-lbs/in) | 0.8 | 8.4 | 0.7 | 0.9 | 0.7 | 0.9 |
| GFWI (in-lbs) | <2 | 296 | <2 | <2 | <2 | <2 |

[1]Styrene/N—(benzocyclobutenyl)maleimide copolymer of Example 1.
[2]Styrene/N—phenylmaleimide copolymer (3.5 weight % N—PMI).
[3]Ethylene/propylene/1,4-hexadiene terpolymer (3.6 weight % 1,4-hexadiene).

The above data illustrate the superior impact properties of Composition B, a graft polymer according to this invention.

It will be evident from the foregoing that various modifications can be made to this invention. Such, however, are considered as being within the scope of the invention.

What is claimed is:

1. A graft polymer represented by formula (I):

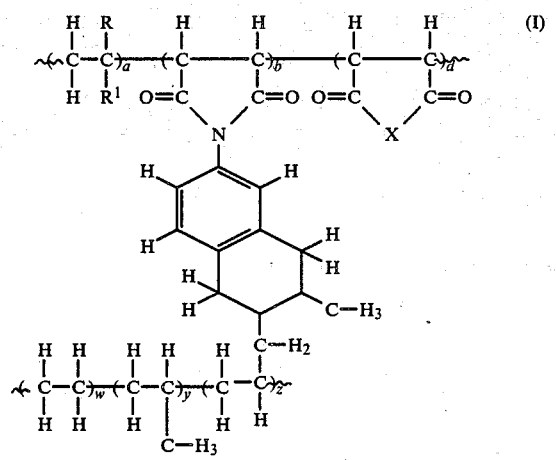

wherein R represents hydrogen or alkyl; $R^1$ represents phenyl, alkyl substituted phenyl, chloro or bromo substituted phenyl, $CO_2H$, $CO_2CH_3$, $CO_2CH_2CH_3$, or $C\equiv N$; X represents O, NH, $NCH_3$, $NCH_2CH_3$, $NC(CH_3)_3$, $NC_6H_5$, $N\text{-}(p\text{-}Br)C_6H_4$, $N\text{-}(p\text{-}CH_3)C_6H_4$, $N\text{-}[p\text{-}C(CH_3)_3]C_6H_4$, or $N\text{-}(p\text{-}CH_3O)C_6H_4$; the mole percent of the total recurring units designated by subscripts a+b+d equals 100 with a being a number from about 95 to about 99.5, b being a number from about 0.5 to about 5, and d being a number from 0 to about 45, with the proviso that if the recurring unit designated by subscript d is present, it is directly substituted for the recurring unit designated by the subscript a; the mole percent of the total recurring units designated by subscripts w+y+z equals 100, with w being a number from about 30 to about 55, y being a.number from about 44.9 to about 55, and z being a number of from about 0.1 to about 15; and, wherein at least 1 percent of the recurring units designated by the subscript b and at least 1 percent of the recurring units designated by the subscript z have been reacted to form a graft structure.

2. A graft polymer represented by formula (II):

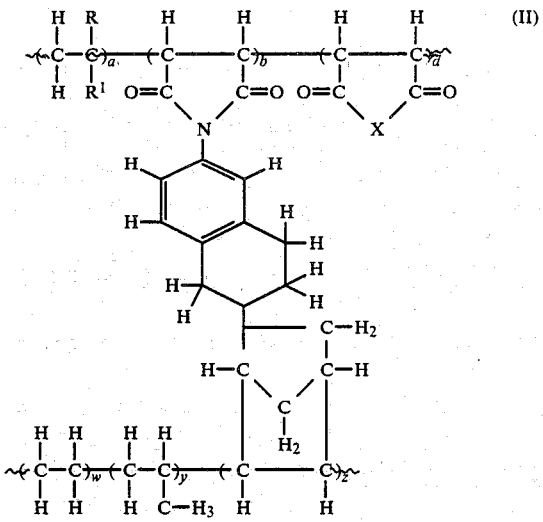

wherein:

R represents hydrogen or alkyl;

$R^1$ represents phenyl, alkyl substituted phenyl, chloro or bromo substituted phenyl, $CO_2H$, $CO_2CH_3$, $CO_2CH_2CH_3$, or $C\equiv N$; X represents O, NH, $NCH_3$, $NCH_2CH_3$, $NC(CH_3)_3$, $NC_6H_5$, $N\text{-}(p\text{-}Br)C_6H_4$, $N\text{-}(p\text{-}CH_3)C_6H_4$, $N\text{-}[p\text{-}C(CH_3)_3]C_6H_4$, or $N\text{-}(p\text{-}CH_3O)C_6H_4$; the mole percent of the total recurring units designated by subscripts a+b+d equals 100 with a being a number from about 95 to about 99.5, b being a number from about 0.5 to about 5, and d being a number from 0 to about 45, with the proviso that if the recurring unit designated by subscript d is present, it is directly substituted for the recurring unit designated by the subscript a; the mole percent of the total recurring units designated by subscripts w+y+z equals 100, with w being a number from about 30 to about 55, y being a number from about 44.9 to about 55, and z being a number of from about 0.1 to about 15; and wherein at least 1 percent of the recurring units designated by the subscript b and at least 1 percent of the recurring units designated by the subscript z have been reacted to form a graft structure.

3. A graft polymer represented by formula (III):

(III)

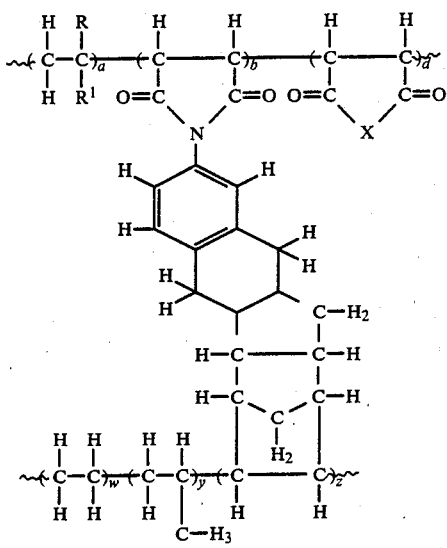

wherein:
R represents hydrogen or alkyl;
$R^1$ represents phenyl, alkyl substituted phenyl, chloro or bromo substituted phenyl, $CO_2H$, $CO_2CH_3$, $CO_2CH_2CH_3$, or $C \equiv N$; X represents O, NH, $NCH_3$, $NCH_2CH_3$, $NC(CH_3)_3$, $NC_6H_5$, $N$-$(p$-$Br)C_6H_4$, $N$-$(p$-$CH_3)C_6H_4$, $N$-$[p$-$C(CH_3)_3]C_6H_4$, or $N$-$(p$-$CH_3O)C_6H_4$; the mole percent of the total recurring units designated by subscripts $a+b+d$ equals 100 with a being a number from about 95 to about 99.5, b being a number from about 0.5 to about 5, and d being a number from 0 to about 45, with the proviso that if the recurring unit designated by subscript d is present, it is directly substituted for the recurring unit designated by the subscript a; the mole percent of the total recurring units designated by subscripts $w+y+z$ equals 100, with w being a number from about 30 to about 55, y being a number from about 44.9 to about 55, and z being a number of from about 0.1 to about 15; and wherein at least 1 percent of the recurring units designated by the subscript b and at least 1 percent of the recurring units designated by the subscript z have been reacted to form a graft structure.

4. A method of producing the graft polymer of claim 1 comprising reacting a first and a second polymer at a reaction temperature equal to or greater than 250° C., said first copolymer being represented by the following formula:

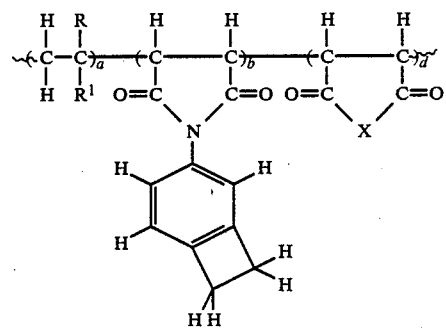

wherein R, $R^1$, X, a, b, and d are as defined and said second copolymer is represented by the following formula:

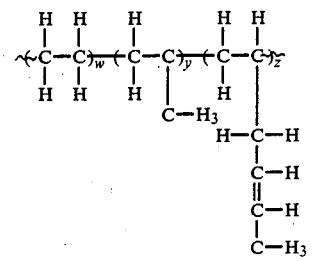

wherein w, y, and z are as defined.

5. A method of producing the graft polymer of claim 2 comprising reacting a first and a second polymer at a reaction temperature equal to or greater than 250° C., said first copolymer being represented by the following formula:

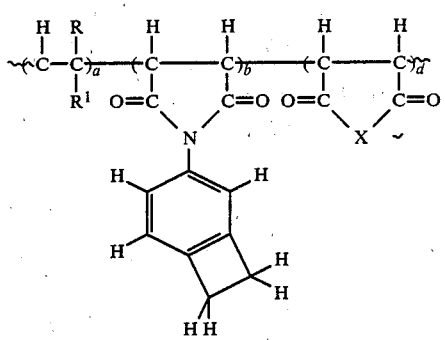

wherein R, $R^1$, X, a, b, and d are as defined and said second copolymer is represented by the following formula:

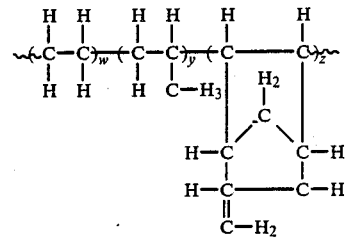

wherein w, y, and z are as defined.

6. Also according to this invention there is provided a method of producing the graft polymer of claim 3 comprising reacting a first and a second polymer at a reaction temperature equal to or greater than 250° C., said first copolymer being represented by the following formula:

second copolymer is represented by the following formula:

wherein R, R¹, X, a, b, and d are as defined and said wherein w, y, and z are as defined.

7. A moldable composition comprising the graft polymer of claim 1.

8. A moldable composition comprising the graft polymer of claim 2.

9. A moldable composition comprising the graft polymer of claim 3.

10. A method of producing a molded composition comprising (a) producing a graft polymer according to the method of claim 4 and (b) molding the resulting graft copolymer.

11. The method of claim 10 wherein said composition is molded in contact with a filler.

12. A method of producing a molded composition comprising (a) producing a graft polymer according to the method of claim 5 and (b) molding the resulting graft copolymer.

13. The method of claim 12 wherein said composition is molded in contact with a filler.

14. A method of producing a molded composition comprising (a) producing a graft polymer according to the method of claim 6 and (b) molding the resulting graft copolymer.

15. The method of claim 14 wherein said composition is molded in contact with a filler.

* * * * *